United States Patent [19]

Spence-Bate

[11] 4,029,412

[45] June 14, 1977

[54] MULTI-STANDARD REPROGRAPHIC CAMERA

[76] Inventor: Harry Arthur Hele Spence-Bate, 115 Cheam Place, Morley, Australia, 6062

[22] Filed: Oct. 7, 1975

[21] Appl. No.: 620,279

[30] Foreign Application Priority Data

| Oct. 8, 1974 | Australia | 9175/74 |
| Dec. 9, 1974 | Australia | 9946/74 |
| Apr. 14, 1975 | Australia | 0918/75 |

[52] U.S. Cl. .................................................. 355/64
[51] Int. Cl.² ........................................... G03B 27/32
[58] Field of Search ............... 355/64, 59, 43, 57, 355/61, 60, 62, 65, 66, 71, 74, 75; 354/288

[56] References Cited

UNITED STATES PATENTS

| 1,001,386 | 8/1911 | Goddard | 354/288 |
| 2,095,815 | 10/1937 | Hopkins | 355/62 X |
| 2,420,023 | 5/1947 | Wekeman | 355/61 |
| 2,494,077 | 1/1950 | Wilkinson | 355/74 X |
| 2,496,329 | 2/1950 | Briechle et al. | 355/62 X |
| 3,369,448 | 2/1968 | Dacquay | 355/62 X |
| 3,689,149 | 9/1972 | Livingood | 355/64 X |
| 3,826,571 | 7/1974 | Spence-Bate | 355/43 X |

FOREIGN PATENTS OR APPLICATIONS

| 992,455 | 7/1951 | France | 355/62 |
| 218,267 | 1/1925 | United Kingdom | 355/62 |

Primary Examiner—Donald A. Griffin
Attorney, Agent, or Firm—Fidelman, Wolffe & Waldron

[57] ABSTRACT

Microfiche or microfilm cameras which are provided with a variable format masking assembly and a facility to change the reduction ratio. In two constructions of the camera the head of the camera remains fixed with relation to the base. In one construction the photographing lens is movable in the head along the optical axis for change of reduction ratio and in this construction a mirror is provided in the head between the lens and copying table. In a second construction the copying table is movable into a well in the camera base and lighting may be provided into the well. In order to use microfiche film more economically various new microfiche layouts are devised as being suitable for these cameras.

16 Claims, 14 Drawing Figures

1:20

1:18

1:19

1:20

1:24

1:25

MULTI-STANDARD REPROGRAPHIC CAMERA

The present invention relates to a camera suitable for photographing onto microfiche or microfilm large size drawings, charts or maps.

International standard No. ISO 2708 sets out two different microfiche image arrangements based on the A series international paper sizes from 4A0 down to A6 as fitted into a standard microfiche which is itself A6 size. The reductions necessary to fit the various A sizes onto an A6 microfiche while leaving a titling area are 1:9, 1:12.75, 1:18, 1:25.5, in the first arrangement and 1:10.5, 1:15, 1:21.2 and 1:30 in the second arrangements. It will therefore be readily understood that to provide an instrument that will cover the full range of A sizes, that is 9 sizes from 4A0 to A6 and 8 different reduction ratios from 1:9 to 1:30 requires an instrument of considerable complexity if the correct mask and lens is to be available or else the instrument is merely set up to one or two A sizes and one or two magnifications. In the former case the complexity of the providing for so many alternatives with 9 different masks and 8 different reduction ratios would entail a cumbersome and costly instrument and in the latter case the capability of only being able to cover a few A sizes would result in considerable waste in microfiche recording area if A sizes were to be mixed on one microfiche. It is possible to avoid waste in this case by changing the magnification of recording but this causes problems when reading the microfiche. It will be noted that when the ISO 2708 standard was drawn up, four countries disapproved of the standard on technical grounds.

It is with these problems in mind that there is provided according to the invention a microfiche or microfilm camera having at least one photographing lens and shutter and a mask assembly, said mask assembly comprising two or more side members each member being arranged to be movable with respect to the other whereby the size of the mask can be varied.

Preferably there are four side members. In one embodiment of the invention the side members are mounted in parallel pairs on two drums or shafts having oppositely formed threads or helices so that rotation of either drum or shaft causes the members of a pair to diverge or converge.

In an alternative embodiment the side members are linked in parallel pairs by linking members with camming members controlling divergence and convergence of the members of each pair.

Preferably the camera according to the invention is provided with a plurality of lenses which may be mounted on a linear slide or rotatable turret. The shutter is preferably mounted adjacent the slide or turret and the shutter and slide or turret arranged to be movable with respect to the mask assembly and film plane.

In a microfiche or microfilm camera having a constant magnification copying lens and arranged only for recording on a single format, there is no particular problem in lining up a document to be copied on the camera copying table. It is simple in such a camera to indicate the size of the format on the copying table by providing marks or indicators on the table. However, in cameras where the magnification and format can be varied it becomes increasingly complicated and confusing to provide suitable indicators.

Accordingly a microfilm or microfiche camera having a copying lens and copying table is provided according to the invention with a device comprising a light source arranged to project a beam of light through a masking means and auxiliary lens onto a light deflecting means arranged to deflect the beam of light into an optical axis between the lens and copying table whereby the beam of light indicates the image size of a particular format required for copying.

Preferably, the beam of light has an axis at right angles to the optical axis and the light deflecting means comprises a mirror which can be movable into or out of the optical axis.

The masking means may comprise a plurality of masks mounted for rectilinear movement on the masking means or alternatively different sized or shaped masks may be provided on a rotatable turret or disc. Preferably a condenser is provided between the light source and masking means.

In one embodiment of the invention a condenser, masking means and auxiliary lens are provided in the light source axis and the light deflecting means is arranged to be actuated by a solenoid.

The invention will now be described with reference to the accompanying drawings in which:

FIG. 1 shows in perspective a camera according to a first embodiment of the invention, FIG. 2 shows in perspective a camera according to a second embodiment of the invention, FIG. 3 shows a multiple lens slide for the camera shown in FIG. 1 or 2, FIG. 4 shows a multiple lens turret for the camera shown in FIG. 1 or 2, FIG. 5 shows a variable format mask for the camera shown in FIG. 1 or 2, FIG. 6 shows a second variety of variable format mask for the camera shown in FIG. 1 or 2, FIGS. 7 to 12 show various formats for use on a standard A6 microfiche as produced by the camera of FIG. 1 or 2, FIG. 13 shows a method of operating the camera of FIG. 1 or 2 when scanning a large record, FIG. 14 shows in perspective a projector for locating a document in the cameras of FIGS. 1 or 2.

FIG. 1 shows a camera 1 designed to record on A6 sized microfiche documents of as large a size as 4A0 with one convenient lens arrangement or even as large as 350 × 250 cm with 25 × reduction or 420 × 300 cm with 30 × reduction. In order to obtain 30 × reduction the front focal length must be very long or else the lens must have a wide angle. Wide angled lenses tend to cause image distortion and therefore to effectively shorten the front focal length between lens 2 and centre point 3 on the object plane 4 a mirror 5 is interposed in the optical axis 6. The lens 2 is preferably one of several carried either on a rotatable turret 7 or a slide as will be discussed later. The turret or slide may be itself movable along the upper part 8 of the optical axis 6 in order to provide a further set of reduction ratios. The turret 7 is provided with a shutter which moves along the axis 8 with the turret in a camera head 9. The camera head 9 also accommodates a variable size mask which is held in fixed relationship to the object plane 4 and will be discussed hereafter. Film handling equipment preferably of a step and repeat design which is discussed in the inventor's U.S. Pat. No. 3,628,865 and in his pending U.S. Patent Application Ser. No. 586,656, filed June 13, 1975 are also provided in the camera head 9. The shutter, mask and film handling equipment is not shown in the drawing for the sake of clarity. Controls for the camera are provided at 11.

As can be seen in FIG. 1 the camera head 9 is fixed in relation to the object plane 4 on a recording table 10. This ensures that vibration and movement of the lens is kept to a minimum and thus the recording maintains as high a quality as is possible. The only lens movement is that when the turret is bodily moved to enable a fresh set of reduction ratios to be used.

Conveniently the reduction ratios of ISO standard No. ISO 2708 are used and the first 4 ratios 1:9, 1:12.75, 1:18 and 1:25.5 (ISO arrangement A) can be provided for by four lenses on the turret 7 fixed in one position with relation to the object plane 4. While the second 4 ratios 1:10.5, 1:15, 1:21.2 and 1:30 (ISO arrangement B) can be provided for by simple axial movement of the turret since there is a constant ratio of 0.85:1 between the first and second group of ratios. If other reduction ratios than those given in ISO 2708 are required these can be provided for either by fitting further lenses to the turret or providing further axial shifts. The advantages and disadvantages of various standards will be discussed subsequently and it will be seen that in some cases ratios of 1:19, 1:20, 1:24 and 1:25 have considerable advantages.

In an alternative camera shown in FIG. 2 where a fixed head 12 is also provided above a recording table 13 advantage has been taken of the height of the table 13 to provide a well 14 into which a section 15 of the table 13 can be made to descend. The well walls 16 accommodate illuminating means (not shown for the sake of clarity) the heat from which can be ducted away. The illuminating means thus surround the whole record on the lowered table section 15 and due to multiple reflections, a very even light level can be achieved on the record to be recorded. The arrangement is also convenient for the operator since the heat and/or the glare from the illumination is shielded from the operator.

Regarding the document table, this can be fitted with a vacuum platen where the vacuum can be reversed to pressure so that drawings can be floated onto the table, and by a foot peddle or the like, the direction of air can be reversed and the drawing sucked on. This air flow can be once again changed for easy removal of the drawing.

In order to cover every aspect of orientation the camera head has means provided to rotate images around the optical axis. This can be done by rotating the film holding device in the camera head together with the mask. In the above cameras the mask is mounted close to and is associated with the film holding device while the shutter is mounted adjacent to the lens turret or slide.

A lens slide and turret are now described with reference to FIGS. 3 and 4.

In FIG. 3 four lenses 20, 21, 22 and 23 are mounted on a slide 24 which can move in a linear direction 25 in a slide block or base 26. Also mounted on the block 26 is a shutter 27 mounted so as to be close to the lens 21 which is in use. In FIG. 4 four lenses 30, 31, 32 and 33 are mounted on a rotatable turret 34. In a similar way to the arrangement shown in FIG. 3 a shutter 35 is mounted in close proximity to lens 33 which is in use. The turret 34 and shutter 35 are both mounted on a base plate 36. In both lens arrangements in FIGS. 3 and 4 the lenses and shutters can move axially away or toward the film plane in directions 28 and 38 respectively in order to focus for various lenses and reductions.

As has been previously mentioned a variable size mask is required to allow for the different formats which may be required. As these vary at any rate from A6 to 4A0 at least 9 formats are required. In further standards other formats may be required. While previous cameras have been able to cover the few formats with rotatable mask turret such an arrangement cannot easily or satisfactorily cope with 9 or more formats and the cameras shown in FIGS. 1 or 2 are therefore provided with a variable size mask. Two preferred arrangements are shown in FIGS. 5 and 6 but it should be understood that other arrangements such as using a wedge or carriage could be employed.

In FIG. 5 the variable size mask is formed from two pairs of masking blades 40, 41 and 42, 43. The first pair 40 and 41 are movable at right angles to the second pair 42 and 43. Each pair of blades is moveable towards or away from each other by opposed threaded rollers 44 and 45 driven by motors 46 and 47 respectively. It will be appreciated that by activating the motors 46 and 47 the shaded area 48 representing the masking area can be varied in size.

In FIG. 6 pairs of masking blades 50, 51 and 52, 53 are linked together in parallelogram formation by pivoted links 54 and the position of the blades is controlled by cams 55 and 56. By movement of the cams 55 and 56 the masking area 58 can be varied in size.

The camera film is carried preferably on a suction platen or cassette and is moved in close proximity to the mask.

Having provided a variable format mask it will now be appreciated that on one microfiche an image of representing say A0 can be recorded with one or more A4 images with the same reduction. In this way when reading the images they can both be read with the same magnification and are reproduced in their original size. Also different sized images can be recorded on a microfiche so that little of the microfiche area is wasted.

Generally speaking unless the ISO 2708 range of reductions is being used a reduction range of between 18 and 25 is preferable and the use of this range will now be explained with reference to FIGS. 7 to 12. In these figures microfiche formats are proposed which not only have titling areas but also have coding areas or strips which enable automatic retieval of microfiche.

Figure 10:
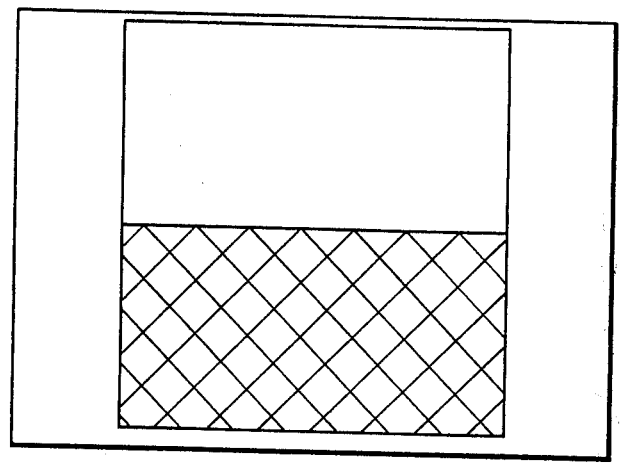

FIG. 10 shows a format for accommodating two images 1 meter wide by 180 cm long. Drawings of this size are used in the automobile industry. Titling may be provided on one side and coding on the other.

Figure 11:
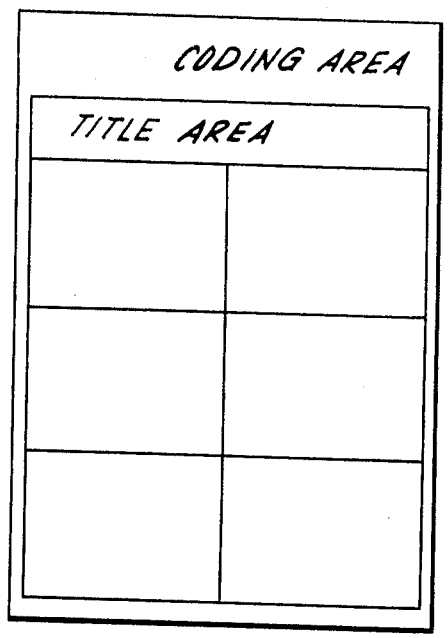
Figure 12:
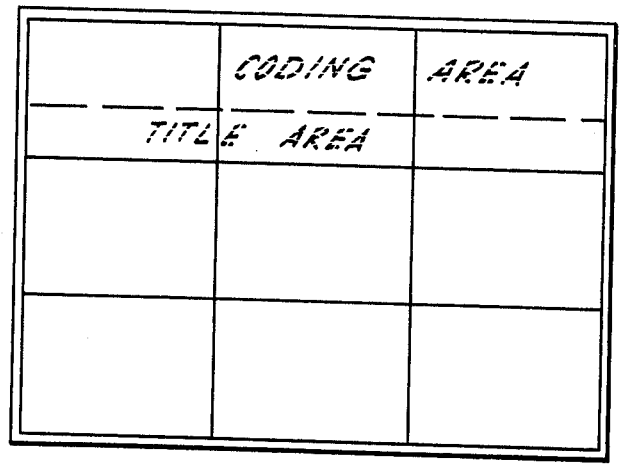

FIGS. 11 and 12 show divisions of an A6 microfiche suitable for 24 and 25 × reduction which are suitable for use with the ratio 24 × reduction.

Figure 1:
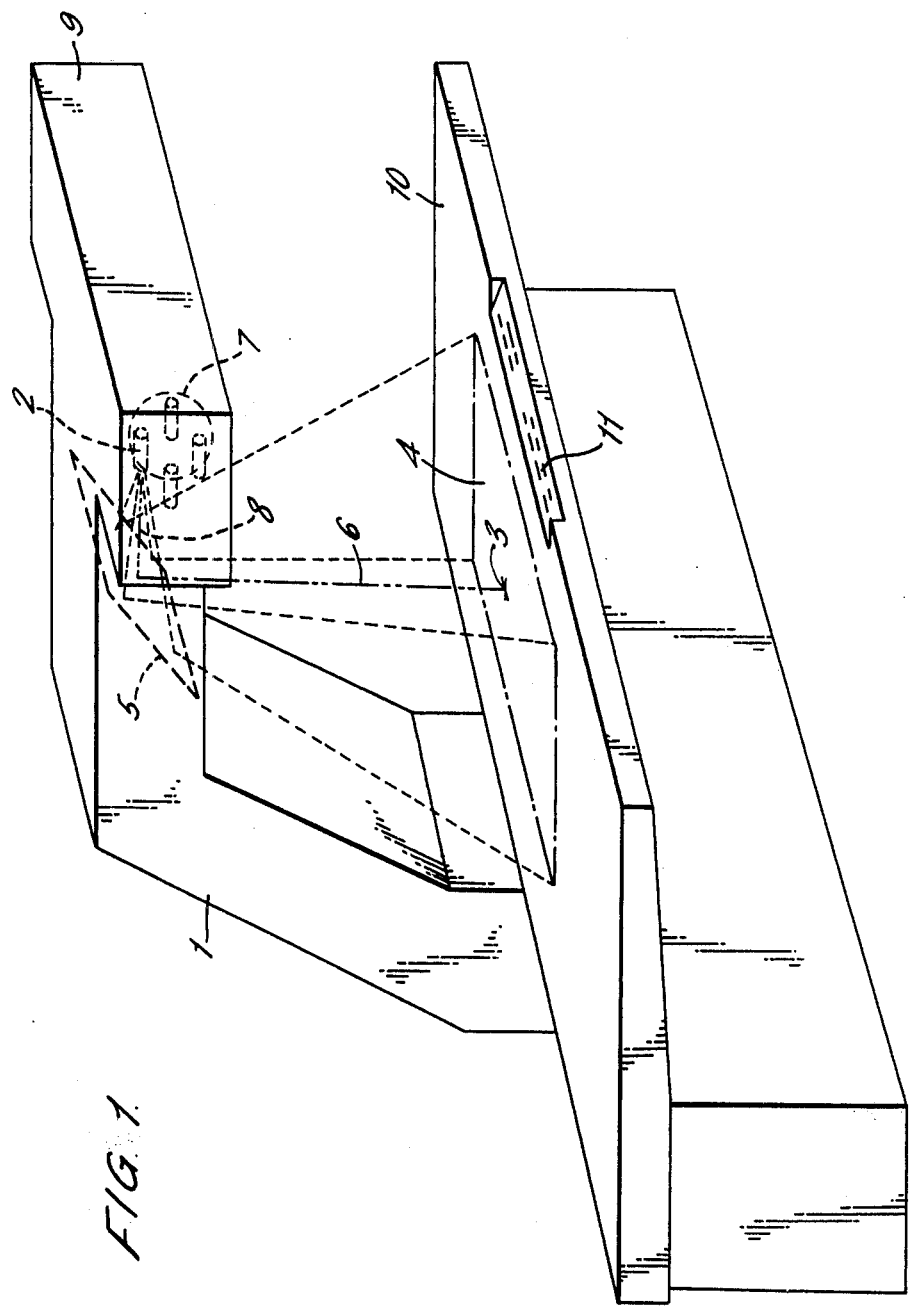
Figure 2:
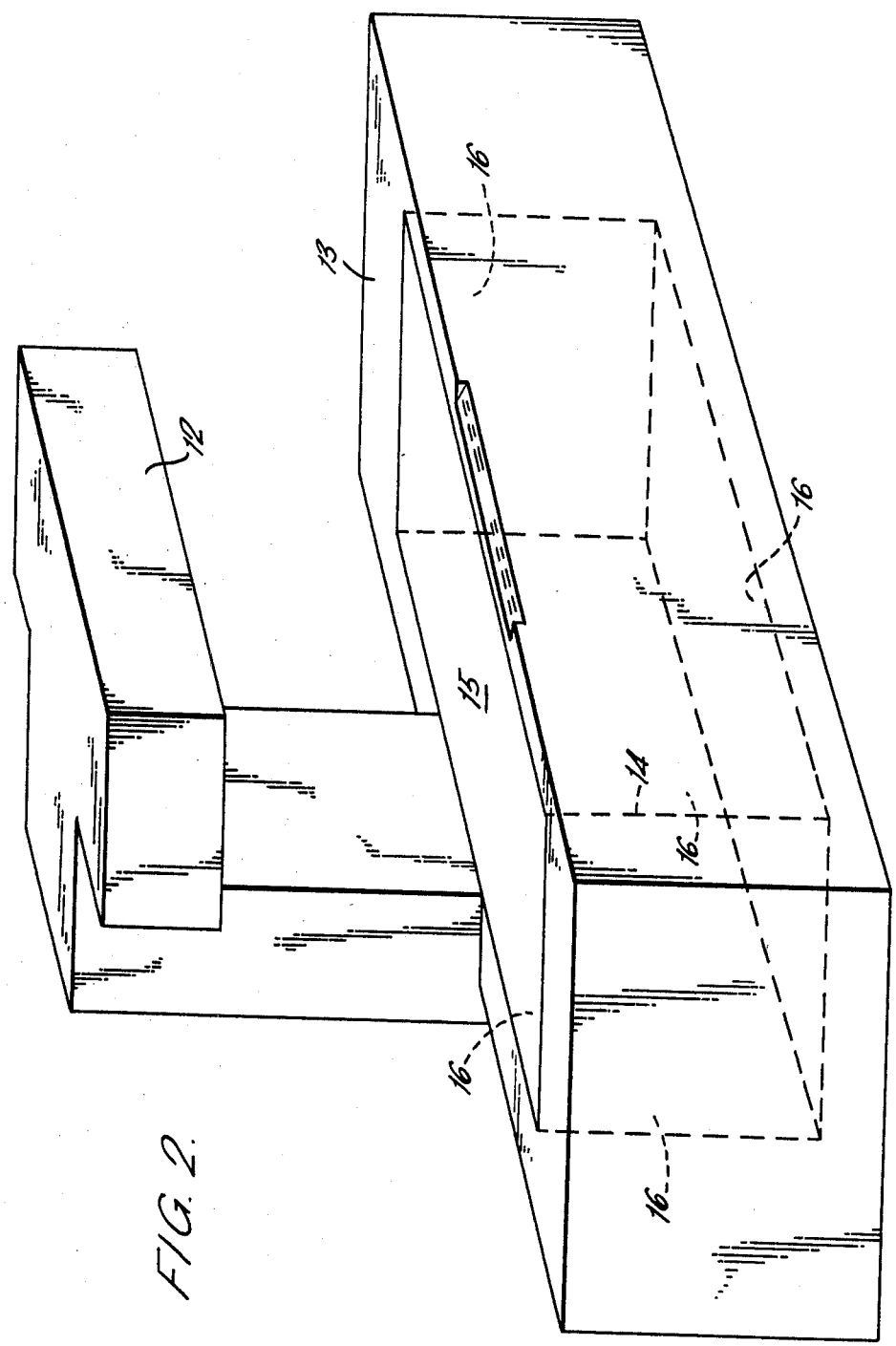
Figure 3:
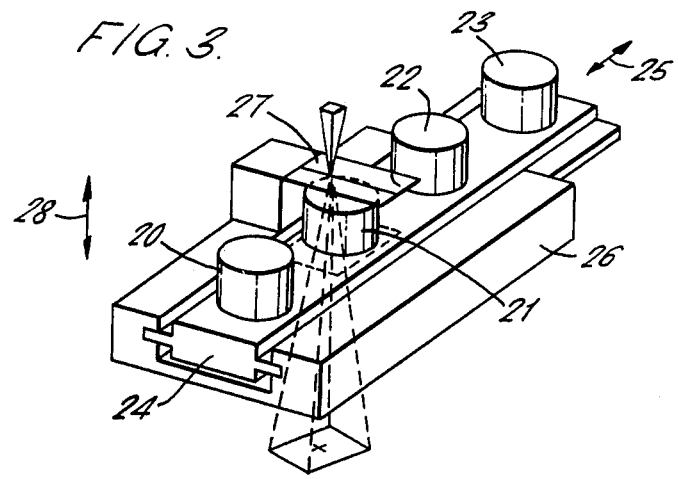
Figure 4:
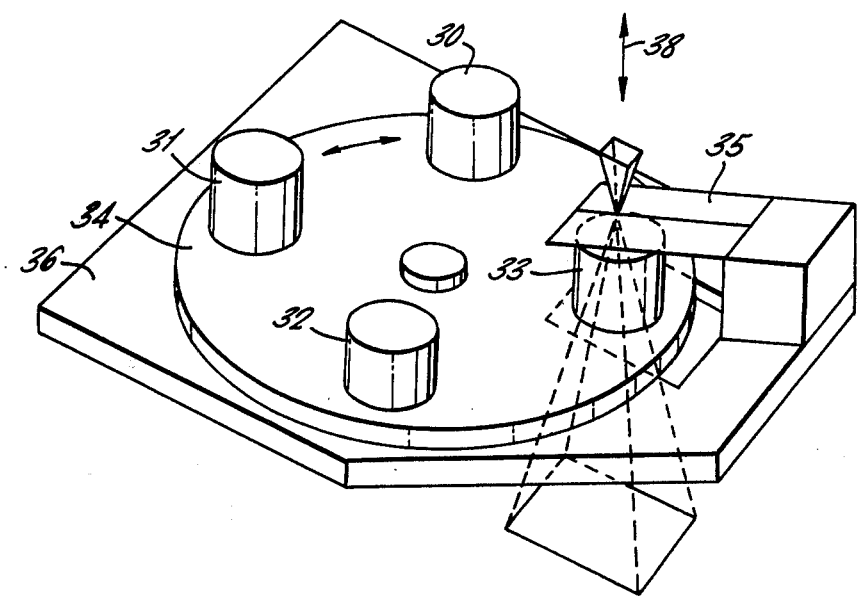
Figure 5:
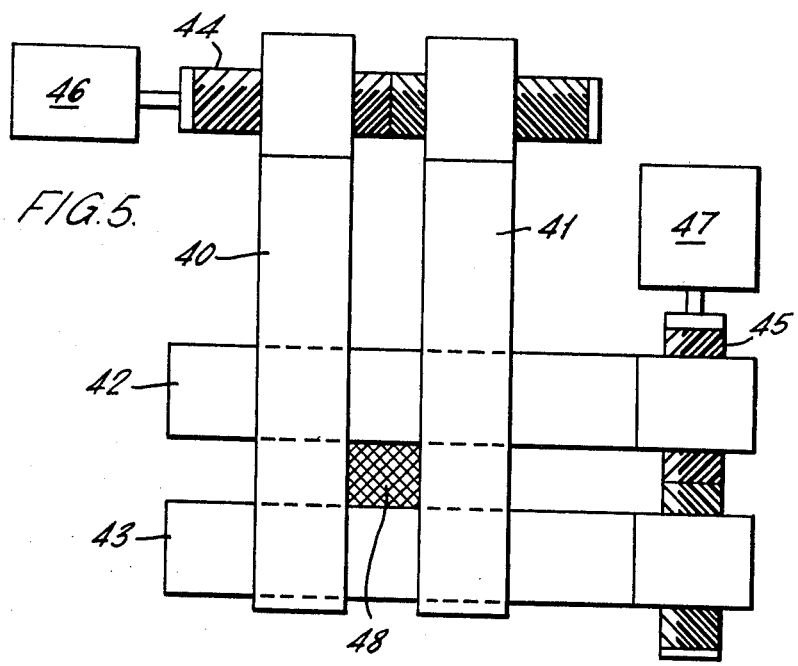
Figure 6:
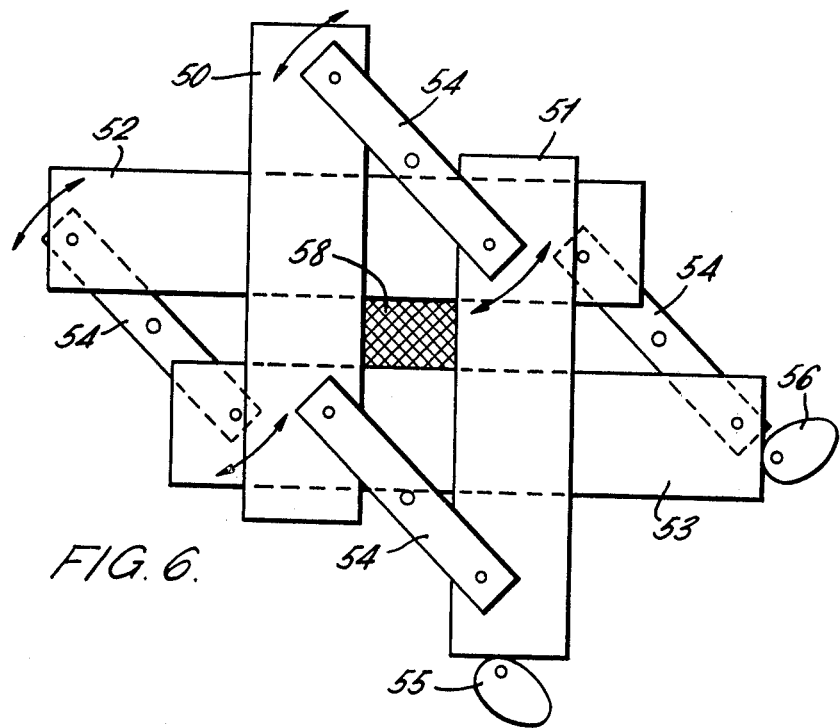
Figure 7:
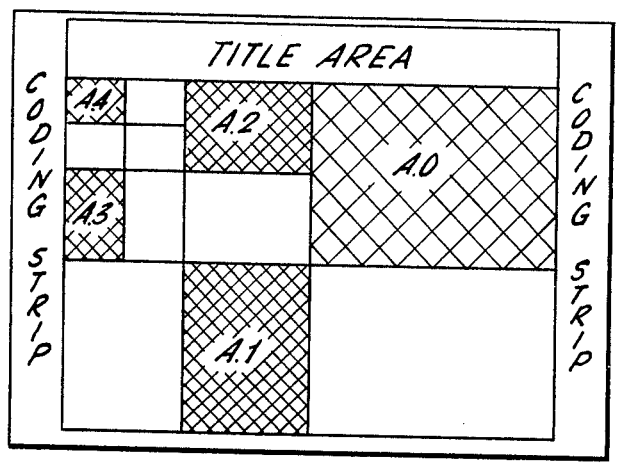
FIG. 7 shows a layout of International A series drawings with an 1:20 reduction. In the event of a requirement to have say a drawing of A0 size in juxtaposition with a list of parts on A4 size this can easily be arranged.
Figure 8:
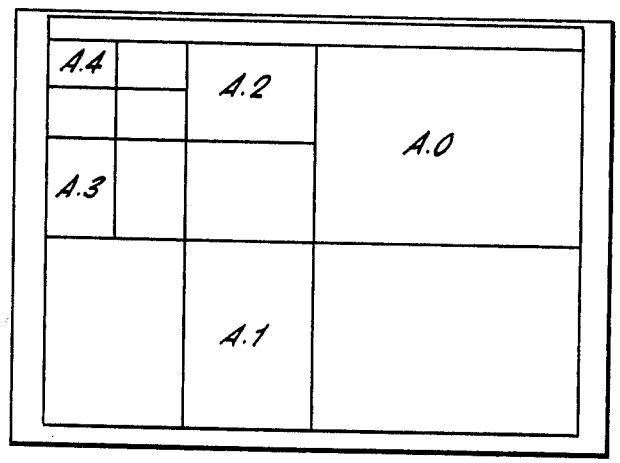
FIG. 8 shows a layout similar to FIG. 7 with a 1:18 reduction. This arrangement is similar to the standard ISO 2708 A image arrangement but the titling space is smaller than the FIG. 7 arrangement.
Figure 9:
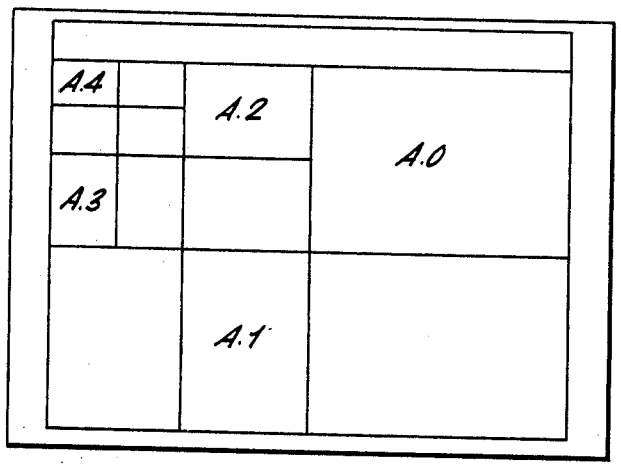
FIG. 9 shows a 1:19 reduction with a layout again similar to FIG. 8. The titling space is larger than the FIG. 8 arrangement.
Figure 13:
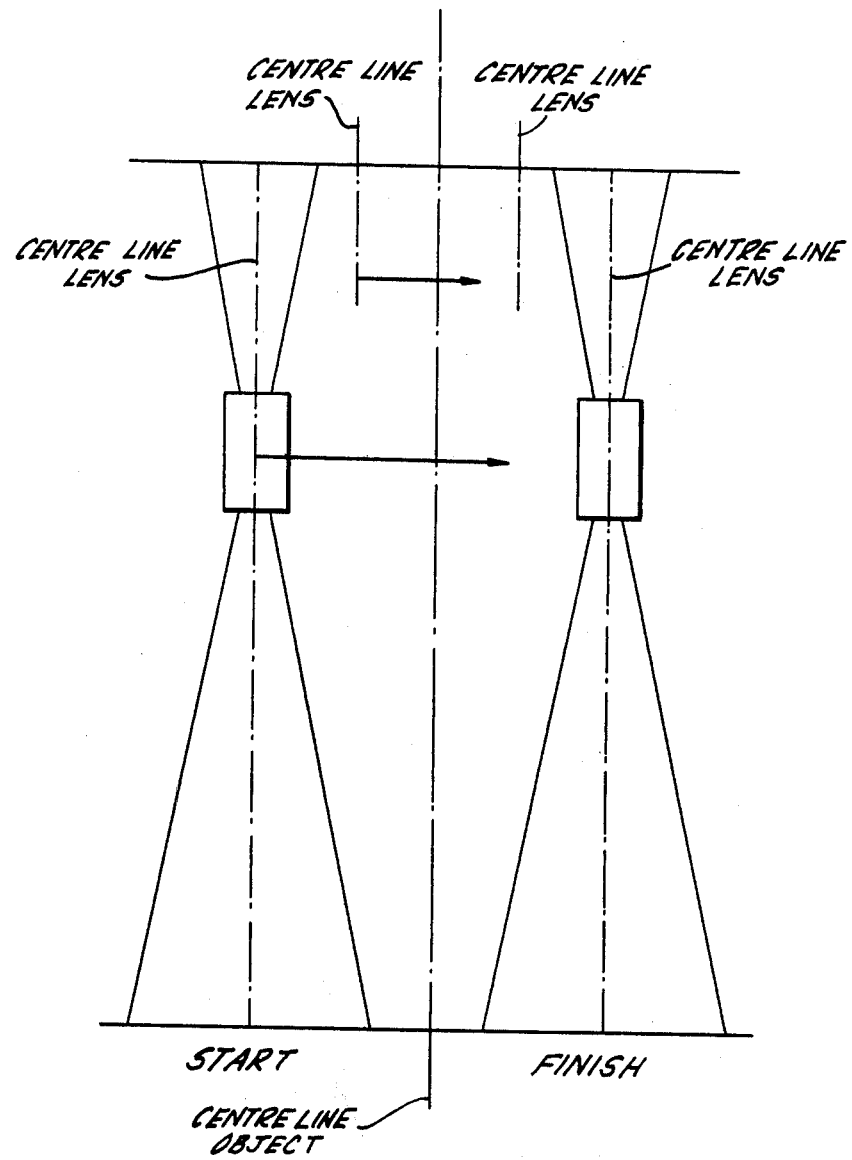

FIG. 13 shows a method of operating the camera of FIG. 1 or 2 when scanning a large record.

The operation of the cameras shown in FIGS. 1 and 2 when different sizes records are being used will now be discussed.

There are two fundamental means of laying out the drawings, firstly by the operator filling up the largest division of the series into appropriate subdivisions according to the sizes of the drawings to be recorded. Where drawings do not fit into divisions or subdivisions conveniently, it is better to leave the layouts to a logic system which indicates the disposition to be used. Drawings are then laid out on the photographic platen consecutively. Individual placement of drawings is convenient especially where a lot of curly drawings are being recorded. It is easy to control one tricky individual drawing, but if there are several of these placed side by side things can get frustrating for the operator.

The easiest and most foolproof way of operating a camera of the above type is that drawings are always fed in the most usual manner, namely with the longer side facing the operator. When no back document lighting is used, the document platen could have appropriately spaced sensors so that when these are covered up, the reduction ratio is selected by the camera itself. However, as some drawings are identical or nearly identical (see 1:9 and 1:18) in size, this simplest method cannot be adopted. The sensors would of course also have initiated the turning of the camera head by 90° according to whether landscape (longer side to operator) or portrait (shorter side to operator) aspect had to be used (Divisions 1, 4, 16, 64 are landscape while Divisions 2, 8, 32 are portrait). To give the instrumentation unambiguous instruction, it is better for the operator to select the magnification. This one press button will also select the ISO 2708 arrangement 'A' or 'B'. 18 times reduction will initiate the 'A' arrangement and will automatically set an 8 row 8 column microfiche grid. In contrast the 15 reduction will set 8 rows and 10 columns grid. To clarify more fully we will go through the 18 times in more detail. Document platen LEDs will indicate the largest size, namely 95 × 133 mm. A drawing of size 23.5 × 33 is laid on the platen and a rotary switch corresponding to 7 positions is rotated with every click; a next lot of LEDs comes on indicating sizes 66 × 95 mm, 47 × 66 mm and 33 × 47 mm respectively. The next size is our drawing size 23.5 × 33 and the "take" button is pressed (with a little practice the correct size can be set straight away). For easier identification the seven clicks can be indicated by Roman numerals, i.e. from I – VII. In the case of arrangement "B" only six clicks would be used, namely from I – VI. The take would be recorded on a Fiche indicator panel and Division 16 would show up. If this is followed by 16.5 × 23.5 mm, this would correspond to double and single Fiche on our CON/COM cameras. The "take" would again record this on the Fiche display. We now have one double Fiche and a single Fiche using our standard camera analogy. The other divisions are larger or smaller versions of the same principle. Division 1 can be viewed as the largest double Fiche in the series. Every time a "take" is made, it gets recorded. A "take" cannot take place until the LED position is "changed" or "confirmed". If the operator wishes to include a drawing for which there is no more place on a Fiche, interlocks will prevent the camera from operating and a warning signal will be issued to the operator. An accessory into which the various sizes of the drawings to be photographed can be fed-in, will advise the operator on the most convenient layout and this can be interlocked with the camera, thus preventing the operator from not following the chosen sequence and thus ensuring the most economical use of the available film space. In the available space on the film lamina, reductions can be changed within (in the case of our chosen example) arrangement "A". The same is true within an interchange of arrangement "B". Furthermore, "A" and "B" arrangement can be placed on the same lamina under certain conditions such as that the top half of a Fiche in "A" arrangement and the bottom half in "B" arrangement is placed on one and the same sheet of film. The instrumentation allows this, but whether this is of any practical significance remains to be seen. An example that could spring to mind is a mixed assortment of drawings, i.e. reduction requirements. Alternative user operation can make all LEDs go out after a "take" and so on. The three criteria are — one, that the instrument records every take size; two that the operator does not, by mistake, work on a previous setting, i.e. may be a wrong setting, and; three, that there are sufficient interlocks to prevent errors but should not interfere with the flow of work. When identical size drawings are being made, the camera has provisions to stay in a preselected mode.

From what has been written above, it can be seen that various combinations are possible; which combination is the best depends on the application and the economics of cost versus size of the equipment and other associated factors.

While the invention is particularly advantageous when applied to microfiche camera since the large film area of a microfiche enables combinations of different sized formats to be combined on one film with consequent economy of film the invention can also be applied to microfilm cameras where the film area is not so great and the saving of film is accordingly not so great.

Figure 14:
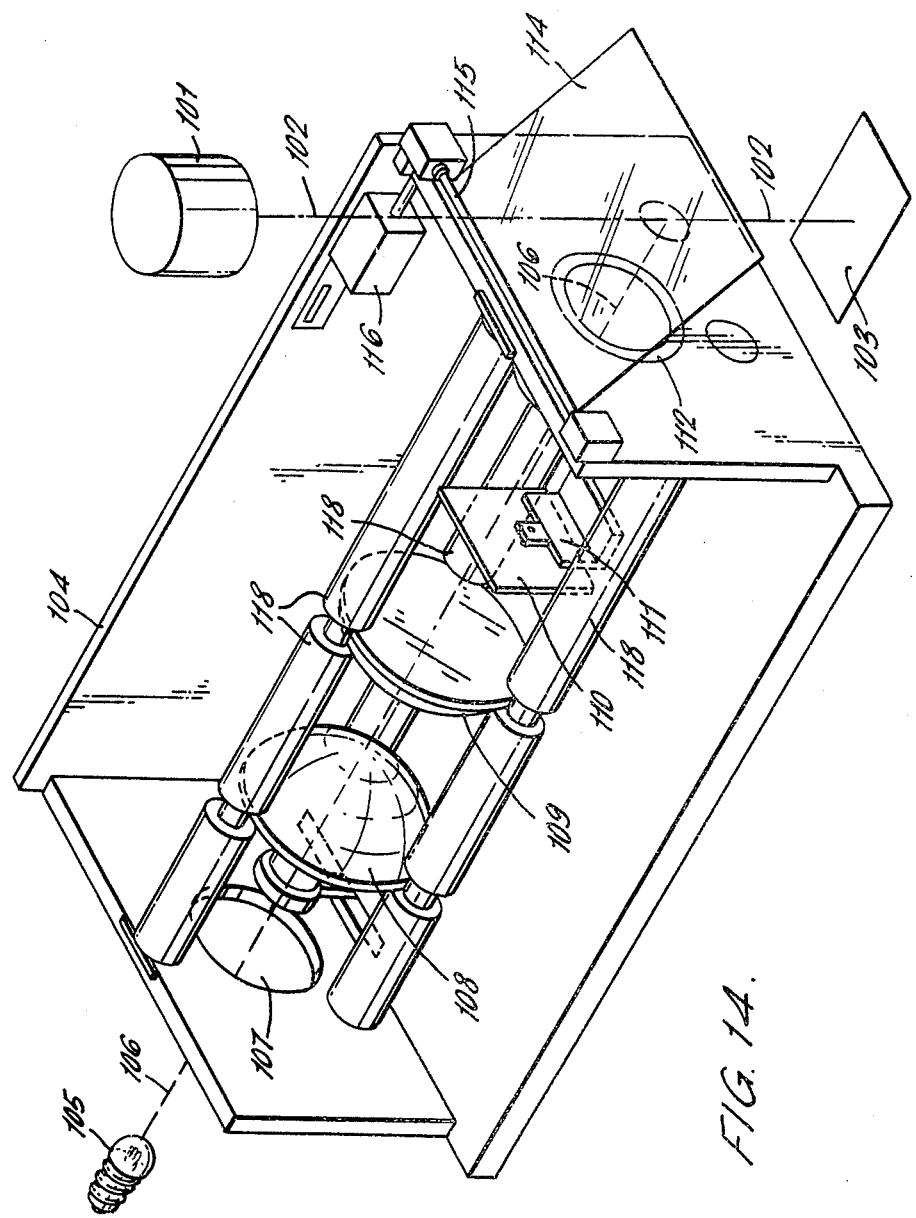

In FIG. 14 there is shown diagrammatically a main camera lens 101 having an optical axis 102 which is projected downwards on to a copying table diagrammatically shown at 103. To one side of the optical axis 102 there is provided a projector device 104 which projects light from a light source 105 along a light source axis 106 which is at right angles to the optical axis 102. The light source axis 106 passes a light source aperture 107 at one end of the projector device and thence through a condenser comprising two lens assemblies 108 and 109. The light source axis then passes through a masking means 110 to an auxiliary lens 112. From the auxiliary lens 112 light is projected along an axis 106 onto a mirror 114 which deflects light from the light source into the optical axis 102.

The masking means 110 is shown with a linear sliding masking plate 111 which is actuated by a solenoid (not shown) so as to provide two different masking formats, depending on the position of the masking plate 111 the linear action of the masking plate can be replaced by a rotary masking disc if required. It will also be appreciated that more than two formats or image sizes can be catered for by providing additional masking plates or masking discs. Equally more than two formats can be accommodated on one slide or disc.

The light deflecting means provided as a mirror 114 is conveniently mounted on a pivot 115 by the auxiliary lens 112 and is actuated by a solenoid 116. The solenoid 116 may be arranged to move the mirror 114 into the optical axis 102 of the main camera lens 101 by means of an electrical circuit connected to the light source 105 so that when the light source 105 is switched on the solenoid 116 brings the mirror 114 into the optical axis 102.

It will be appreciated that a projected image of the standard or format in use is provided on the copying table 103 so that when a document is placed on the table it can be located with ease in a correct position with relation to the project image which indicated the field of view of the main copying lens 101.

Focussing of the projector device can be achieved by moving the device 104 upwards or downwards in a direction parallel to the optical axis 102.

The components of the condenser and other components are conveniently mounted on bars 118.

While the projector device 104 is aligned in an axis at right angles to the optical axis 102 it may be preferable in some cameras to mount this in an axis parallel with the optical axis and for instance arrange the light source to project straight through the optical axis via a lens which can be mounted on a turret on which the main copying lens itself is mounted. In this arrangement when the light source is switched on the turret would rotate the main copying lens out of the optical axis and the auxiliary lens would itself be effectively in the same position as the copying position of the copying lens on the turret.

I claim:

1. A microcopying camera for recording records on microfiche or microfilm comprising a copying table and photographing lens mounted in a camera head with means for adjusting the front focal length of said lens relative to said copying table and the back focal length of said lens relative to said lens and a film transport device mounted in the camera head, the film transport device carrying when in use a microfiche or microfilm film, said means for adjusting the front focal length including means for increasing or decreasing the optical distance along an optical path between said table and said lens, a photographic shutter associated with said lens, and a mask assembly comprising a first and a second pair of masking blade side members, the edges of the members defining a masking frame, each of said pairs consisting of two parallel blades adapted for simultaneous movement towards or away from each other and linked by parallel linking members, each pair connected to a drive means providing said simultaneous movement, said drive means comprising a cam driven by a motor, said cam engaging with a cam surface associated with one of the side members of each pair, whereby adjustment of the front and back focal lengths associated with adjustment of the masking frame enables a plurality of different sized records to be recorded on one film.

2. A camera as claimed in claim 1 wherein the camera head is fixed in relation to the copying table and wherein the lens is movably mounted in the head along the optical path.

3. A camera as claimed in claim 1 wherein the copying table is movably mounted within a well in the instrument base.

4. A camera as claimed in claim 1 wherein a plurality of photographing lenses are mounted on a turret to enable a change of photographing lens by rotation of the turret.

5. A camera as claimed in claim 4 wherein the shutter is mounted adjacent the turret.

6. A camera as claimed in claim 1 wherein a plurality of photographing lenses are mounted on a slide to enable a change of photographing lens by linear movement of the slide. 34

7. A camera as claimed in claim 6 wherein the shutter is mounted adjacent the slide.

8. A camera as claimed in claim 1 provided with a device comprising a light source arranged to project a beam of light through a masking means and auxiliary lens onto a light deflecting means arranged to deflect the beam of light into an optical axis between the lens and copying table whereby the beam of light indicates the image size of a particular format required for copying.

9. A camera as claimed in claim 8 wherein the beam of light has an axis at right angles to the optical axis and light deflecting means comprises a mirror which is moveable into or out of the optical axis.

10. A camera as claimed in claim 8 wherein a condenser is provided between the light source and masking means.

11. A microcopying camera for recording records on microfiche or microfilm comprising a copying table and photographing lens mounted in a camera head with means for adjusting the front focal length of said lens relative to said copying table and the back focal length of said lens relative to said lens and a film transport device mounted in the camera head, the film transport device carrying when in use a microfiche or microfilm film, said means for adjusting the front focal length including means for increasing or decreasing the optical distance along an optical path between said table and said lens, a photographic shutter associated with said lens, and a mask assembly comprising a first and a second pair of making blade side members, the edges of the members defining a masking frame, each of said pairs consisting of two parallel blades adapted for simultaneous movement towards or away from each other, each pair connected to a drive means providing said simultaneous movement, said drive means comprising a drum or shaft having opposed threads or helics thereon, said drum or shaft being arranged to be driven by motor, the opposed threads or helics driving the side members of each pair away or toward each other, whereby adjustment of the front and back focal lengths associated with adjustment of the masking frame enables a plurality of different sized records to be recorded on one film.

12. A camera as claimed in claim 11 wherein the camera head is fixed in relation to the copying table and wherein the lens is movably mounted in the head along the optical path.

13. A camera as claimed in claim 11 wherein the copying table is movably mounted with a well in the instrument base.

14. A camera as claimed in claim 11 wherein a plurality of photographing lenses are mounted on a turret to enable a change of photographing lens by rotation of the turret.

15. A camera as claimed in claim 11 wherein a plurality of photographing lenses are mounted on a slide to enable a change of photographing lens by linear movement of the slide.

16. A camera as claimed in claim 11 provided with a device comprising a light source arranged to project a beam of light through a masking means and auxiliary lens onto a light deflecting means arranged to deflect the beam of light into an optical axis between the lens and copying table whereby the beam of light indicates the image size of a particular format required for copying.

* * * * *